June 16, 1964 P. B. BURRUS 3,137,744
REFRIGERATING APPARATUS
Filed Sept. 19, 1961 2 Sheets-Sheet 1

INVENTOR.
Paul B. Burrus
BY
Carl A Stickel
HIS ATTORNEY

June 16, 1964 P. B. BURRUS 3,137,744
REFRIGERATING APPARATUS
Filed Sept. 19, 1961 2 Sheets-Sheet 2

INVENTOR.
Paul B. Burrus
BY
HIS ATTORNEY 3,137,744
REFRIGERATING APPARATUS
Paul B. Burrus, Lebanon, Ohio, assignor to General Motors Corporation, Detroit, Mich., a corporation of Delaware
Filed Sept. 19, 1961, Ser. No. 139,158
4 Claims. (Cl. 264—45)

This invention pertains to a method of making a plastic foam insulated cabinet such as may be used for refrigerators.

Under ideal conditions and formulations, foam insulation can be made lightweight and uniform in density and high in insulating value. However, it is customary to charge the insulation space with adequate amount of foaming material and then permit the foaming materials to form the foam and be forced by its own expansion to spread throughout the insulation space to fill the insulation space. This has resulted in voids as well as areas of high density along with variations in density and the generation of high pressures. The generation of high pressures in turn required heavy molds to contain the walls of the insulation spaces. Therefore uniform, high quality foam insulation has been attained seldom in mass production.

It is an object of this invention to provide an improved method of making a foam insulated cabinet in which the insulation space is uniformly filled without creating substantial pressures and without voids with a foam insulating material having a substantially uniform minimum density.

It is another object of this invention to provide a simple inexpensive method of venting a cabinet during the pouring and casting of the foam insulation which will assure substantial uniform minimum densities without voids.

It is another object of this invention to provide a method of assured filling with foam forming materials and venting of a cabinet during the pouring and casting of the foam insulation in which the vents are closed when the foam insulating reaches the vents when the vents are no longer needed.

It is another object of this invention to provide a method of distributing and controlling the rate of supply of the foam forming materials into the insulation space of a refrigerator cabinet in such a way that substantially no pressures are developed by the foam forming materials within the insulation space and all parts of the insulation space are filled with foam at a substantially uniform minimum density.

These and other objects are attained in the form shown in the drawings in which a box-shaped mold for the interior of the cabinet is covered with a polyethylene film, the edges of which may be substantially sealed by a Fiberglas strip extending around the bottom of the mold. The outer metal shell of the cabinet is then placed with the open side down over the film surrounding the mold with the front edges thereof in sealing engagement with the Fiberglas and the polyethylene film.

The back of the cabinet is provided with four large struck-up tabs adjacent the four corners thereof. These provide filler openings for filling the insulation spaces. The back of the cabinet is also provided with four rows of uniformly distributed small struck-up tabs providing vent holes for the back of the cabinet. Reinforcing elements are placed around the sides of the outer shell to prevent them from bulging during the foam operation.

Preferably the foam is introduced consecutively through the openings provided by the filler opening tabs. The foam forming materials are introduced either continuously or intermittently through these filler openings at such a slow rate that the material introduced has a chance to foam in the place where it is initially deposited and the succeeding material is foamed on top of the previously introduced foamed material. In this way the previously formed foam need not be displaced in order to attain satisfactory distribution. Whenever the foam formed reaches one of the vent tabs and begins to escape through the vent opening, this vent tab is pushed closed by striking it with a hammer or any other suitable pushing device. The pouring is continued from the one filler opening until the foam material appears in all the vents nearest the opening being used. The struck-out tabs are closed as the foam reaches their openings and they are no longer needed. The remainder of the insulation space is filled consecutively through the introduction of the foam forming materials in the remaining filler openings in a similar manner until the foam has appeared at all of the vent tabs and all of the vent tabs have been closed as previously explained. The filler openings are also closed after use in a similar manner by a hammer or a suitable pushing device. This closes the back of the cabinet. If desired, the sealing compound such as a waterproof form of polyvinyl alcohol may be used over the closed openings.

Preferably the foam forming materials are of the polyetherurethane type containing difluoromonochloromethane or difluorodichloromethane and a cross-linking catalyst. After the pouring of the cabinet, the cabinet is maintained at an elevated suitable curing temperature for a sufficient period of time to cure the resin of foam. Thereafter the cabinet may be removed from the mold and the inner liner inserted into the cavity provided by the mold.

Further objects and advantages of the present invention will be apparent from the following description, reference being had to the accompanying drawings wherein a preferred embodiment of the present invention is clearly shown.

Figure 1:
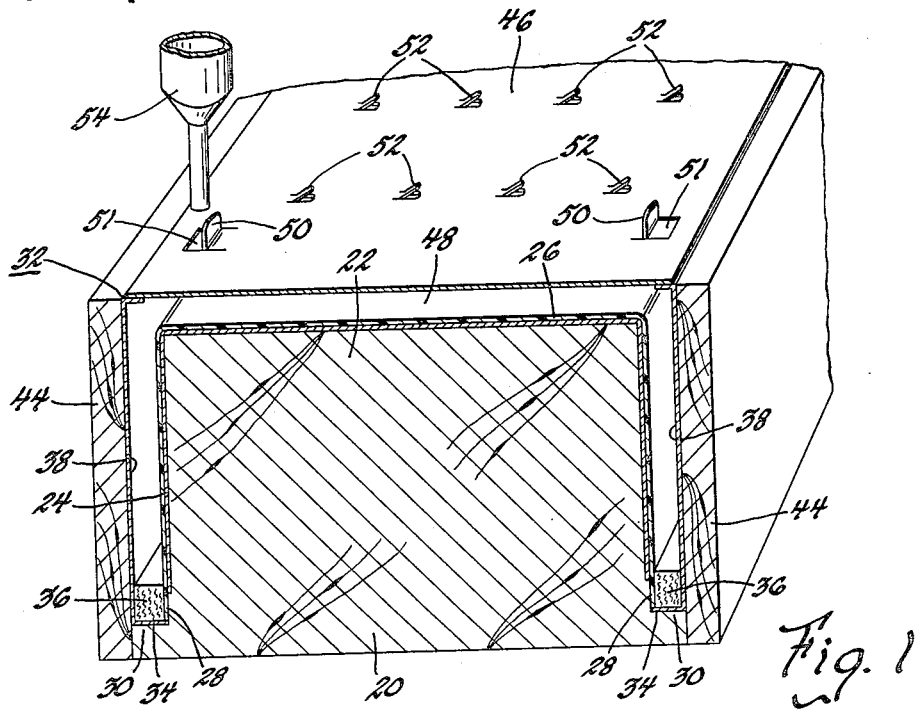
FIGURE 1 is a fragmentary perspective view partly in section of a cabinet and mold embodying one form of my invention.
Figure 2:
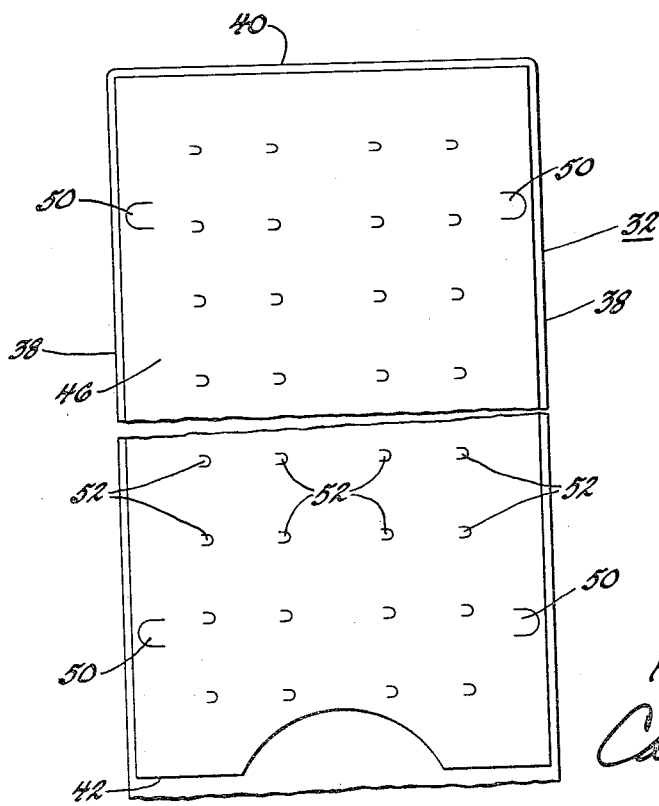
FIGURE 2 is a back view in elevation of the cabinet shown in FIGURE 1.
Figure 3:
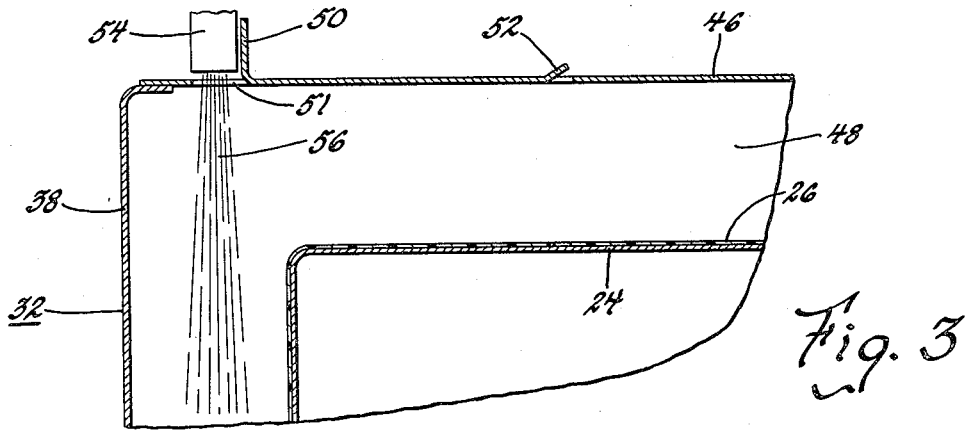
FIGURE 3 is an enlarged fragmentary sectional view partly perspective of a portion of FIGURE 1 illustrating the beginning of the introduction of the foam forming material.
Figure 4:
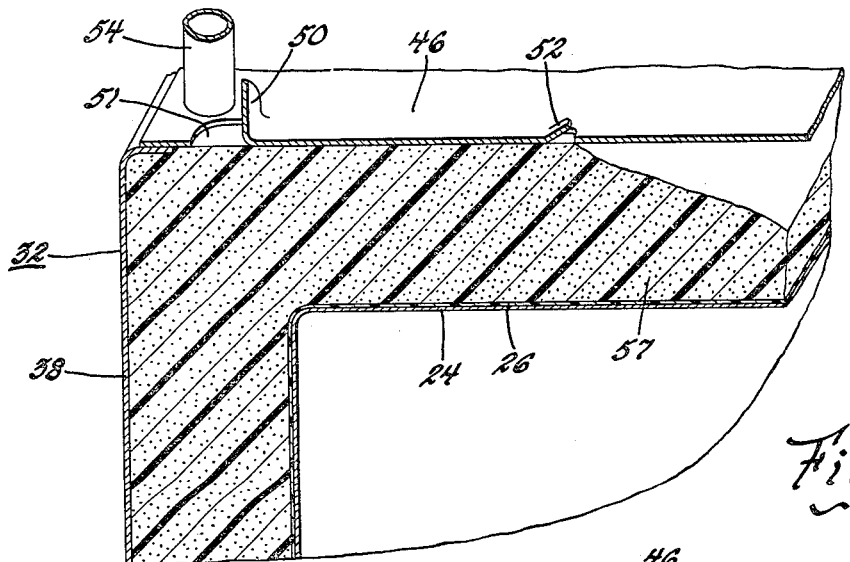
FIGURE 4 is a view similar to FIGURE 3 showing an intermediate stage in the introduction of the foam forming material.
Figure 5:
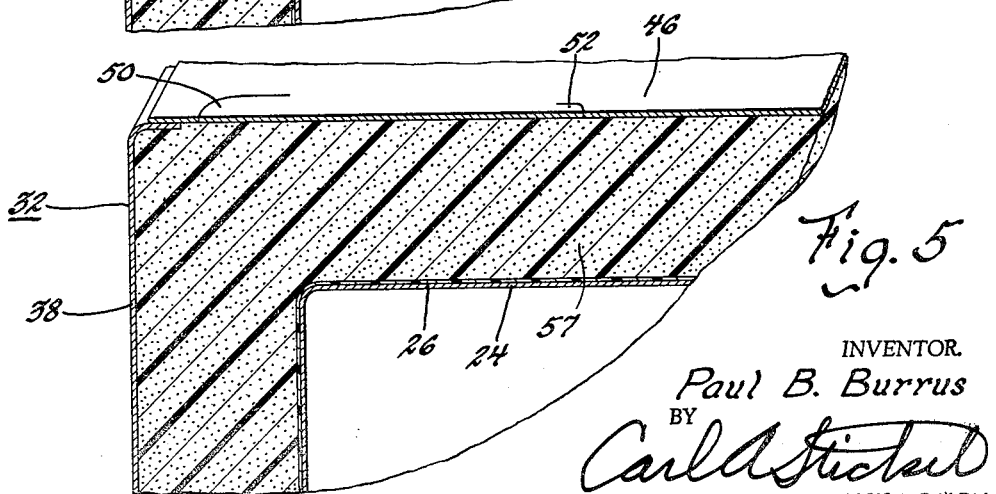
FIGURE 5 is a view similar to FIGURES 3 and 4 showing the completion of the cabinet after the last stage of the foam forming.

One specific example of my improved method of making a cabinet is illustrated in FIGURES 1 to 5. A lower mold 20 is provided having a rectangular projection 22 in the shape of the interior compartment of the cabinet. This projection 22 may be surfaced by a box-shaped metal liner 24 which may be removable from the mold 20 if desired. Also if desired, this box-shaped metal member may serve as the inner liner of the cabinet. Upon the outside of this box-shaped member 24, I prefer to provide a bag 26 of polyethylene film which is nonadherent to the foam material to be used as the insulation of the cabinet. The skirt 28 of the polyethylene bag 26 extends beyond the box-shaped member 24 to a flange 30 provided at the bottom of the mold 20. The outer metal shell 32 of the cabinet telescopes over the polyethylene bag 26 and has its lower edge in FIGURE 1 the inturned flanges 34 which rest upon the outer flanges 30 of the mold 20. If desired, Fiberglas strips 36 may be placed inside the flanges 34 in contact with the adjacent portions of the polyethylene bag 26 to provide a resilient section in which electrical conductors and refrigerant conduits may be laid. The sides 38, the top 40 and the bottom 42 are enclosed in reinforcing elements 44. The reinforcing elements 44 prevent any bulging of the sides 38 or the top 40 or the bottom 42 during the foaming process. The back 46 of the cabinet is securely fastened by welding or other suitable means to the inturned flanges provided by the sides 38, the top 40 and the bottom 42.

Between the bag 26 and the outer shell 32 there is provided an insulation space 48. For the purpose of filling this insulation space 48 the back 46 of the cabinet is provided with four struck-out filler tabs 50 providing four filler openings 51. These struck-out tabs 50 are located along the sides of the back wall 46 over the insulation space 48 and about 11 inches from the top and bottom of the cabinet. Initially these filler tabs 50 are punched out so that they extend approximately at right angles to the surface of the back 46 to provide free access to the filler openings 51. According to my invention, the back 46 is also provided with a plurality of evenly distributed small struck-out vent tabs 52 providing vent and foam inspection openings. As shown, these tabs are arranged in four rows of ten each and extend substantially throughout the center portion of the back wall 46.

Many problems are encountered in filling the insulation space 48 with foam insulation. It has been customary to charge the insulation space with a sufficient amount of materials which will react to form sufficient foam to fill the entire space 48. The liquid materials would collect in the bottom of the insulation space and begin to form foam. With this procedure it is necessary for the foam first formed to be pushed away by the foam formed thereafter. If the initial foam adheres to the walls as is customary, this succeeding foam must shear the preceding foam away from the walls and move it within the insulation space farther away from the source of the foam material. This results in non-uniform density and voids.

According to my invention, from the foam material supply nozzle 54 I supply the foam forming materials at such a slow rate, either intermittently or continuously, to the filler openings 51 provided by the four struck-out filler tabs 50 consecutively at such a slow rate that the material is allowed to foam freely as it is deposited in the insulation space 48 and the foam forming materials introduced thereafter foam on top of the previously formed foam material so that the displacing action previously encountered is not present. This prevents the formation of excessive pressures within the insulation space making unnecessary heavy reinforcements for the walls of the cabinet. It also makes possible a foam material of uniform minimum density having the maximum insulation properties. The supply of the foam forming material 56 continues at the slow rate. When the foam material reaches any one of the vent tabs 52 indicating the filling of the insulation space 48 to that point that tab is pushed closed to seal the opening. The openings adjacent the tabs serve as vents to allow the escape of air and gasses from the insulation space. The closing of the tabs seals the insulation space and prevents the loss of the foam material. The foam forming material continues to be supplied through the one filler opening 51 until the foam 57 has progressively appeared at all of the nearest openings provided adjacent the tabs 52 and the tabs have been pushed closed. That is the foam will have appeared at all of the openings adjacent the tabs 52 in the two rows nearest the tab 50 approximately up to the middle of the cabinet.

After this, the foam forming materials are introduced through a second filler opening 51 adjacent another of the filler tabs 50 and continued at the same slow rate until the foam appears at all the openings adjacent the vent tabs 52 in the area of the second filler opening 51. This procedure insures that the entire insulation space 48 is filled at a substantially uniform minimum density without voids. When the appearance of the foam at all the vent tabs adjacent the filler opening being supplied indicates completion of the filling of the insulation space with the foam in that area, the filling and vent closure procedure is continued similarly at the third and fourth filler openings 51. The carrying out of this procedure insures the filling of the insulation space 48 without voids at a uniform minimum density. If desired, more than four or less than four filler openings may be provided. Also, the number of vent openings provided with tabs 52 may be varied.

For specific foam forming materials, I prefer to use those shown in the John C. Rill, Jr. application, Serial No. 809,702 filed April 29, 1959, assigned to the same assignee as this application.

Another specific example of foam forming materials is as follows:

An ethylene glycol-adipic acid polyester having a hydroxyl number of about 430, an acid number of about 1.50 and a negligible water content is reacted with toluene diisocyanate to produce an isocyanate modified polyester having an isocyanate equivalent of about .80 per 100 grams of the isocyanate modified polyester. A mixture of 100 parts by weight of this isocyanate modified polyester, .50 parts by weight of polyoxyethylene sorbitan monopalmitate emulsifier, and 30 parts by weight of trichloromonofluoromethane (F–11) is kept cool in a tank, such as below 50° F. A second mixture of 60 parts by weight of the ethylene glycol-adipic acid polyester, 12 parts by weight of ethylene glycol, and .25 parts by weight of dimethyl ethanolamine, .25 parts by weight of polyoxyethylene sorbitan monopalmitate emulsifier is kept in another tank. The mixtures from the two aforesaid tanks are supplied separately to the supply nozzle 54 where it is mixed in the ration of 130.5 parts by weight of the first mixture to 72.5 parts by weight of the second mixture. The two mixtures are thoroughly mixed in these proportions and discharged from the supply nozzle 54 as the foam forming material 56.

While the embodiment of the present invention as herein disclosed, constitutes a preferred form, it is to be understood that other forms might be adopted.

What is claimed is as follows:

1. The method of making a structure having walls enclosing a space which includes providing filler opening means and a plurality of distributed openings with struck out tabs in an uppermost positioned wall portion, introducing through the filler opening means materials which will form a foam matter sufficient in amount to substantially fill the space enclosed by the walls, and pushing the struck out tabs selectively into the associated openings as the foam matter appears at the various associated openings.

2. The method of making an insulated cabinet having spaced inner and outer walls including a back wall portion which includes striking out small widely distributed bit portions of the back wall portion to form distributed openings with associated tabs, placing the back wall portion uppermost, introducing into the space between the inner and outer walls materials which will form a foam matter sufficient in amount to substantially fill the space between the walls, and pushing the tabs selectively into their associated openings as the foam matter appears at the various associated openings.

3. The method of making an insulated cabinet having spaced inner and outer walls enclosing a space which includes providing a plurality of filler opening means of adequate size and a multitude of smaller extensively distributed openings throughout the major portion of an uppermost positioned wall outer portion adjacent said filler opening means, introducing through each of the filler opening means materials which will form a foam matter until the foam matter appears at all the adjacent distributed openings, stopping the introduction of said materials at each of said filler opening means when said foam matter appears at all the adjacent distributed openings, and preventing additional introduction of materials by closing each of said filler opening means.

4. The method of making an insulated cabinet having spaced inner and outer walls having a back wall portion which includes striking out tabs of adequate size to form associated filler openings of adequate size in suitable locations in the back wall portion, providing a plurality of smaller widely distributed openings in said back wall portion, placing the back wall portion uppermost, introducing through said filler openings materials which will form a foam matter until the foam matter appears at all of said distributed openings, and pushing the tabs into their associated filler openings.

References Cited in the file of this patent

UNITED STATES PATENTS

| | | |
|---|---|---|
| 2,206,757 | Talalay | July 2, 1940 |
| 2,290,510 | Talalay | July 21, 1942 |
| 2,653,139 | Sterling | Sept. 22, 1953 |
| 2,700,178 | Blake | Jan. 25, 1955 |
| 2,744,042 | Pace | May 1, 1956 |
| 2,764,516 | Pace | Sept. 25, 1956 |
| 2,770,864 | Weese | Nov. 20, 1956 |
| 2,898,634 | Alderfer | Aug. 11, 1959 |
| 2,910,730 | Risch | Nov. 3, 1959 |
| 2,932,386 | Ushkow | Apr. 12, 1960 |
| 2,975,618 | Koch | Mar. 21, 1961 |
| 3,007,208 | Urban | Nov. 7, 1961 |
| 3,012,284 | Touhy | Dec. 12, 1961 |
| 3,041,224 | Sherts et al. | June 26, 1962 |